United States Patent
Ren et al.

(10) Patent No.: US 12,095,750 B2
(45) Date of Patent: Sep. 17, 2024

(54) DATA SENDING METHOD AND APPARATUS AND DATA RECEIVING METHOD AND APPARATUS FOR RESISTING NETWORK COMMUNICATION MONITORING

(71) Applicant: Beijing Beidou Hongpeng Techology Co. Ltd., Beijing (CN)

(72) Inventors: Nana Ren, Beijing (CN); Xintong Liu, Beijing (CN)

(73) Assignee: Beijing Beidou Hongpeng Techology Co. Ltd., Beijing (CN)

( * ) Notice: Subject to any disclaimer, the term of this patent is extended or adjusted under 35 U.S.C. 154(b) by 126 days.

(21) Appl. No.: 18/164,603

(22) Filed: Feb. 5, 2023

(65) Prior Publication Data
US 2023/0188513 A1    Jun. 15, 2023

Related U.S. Application Data

(63) Continuation-in-part of application No. PCT/CN2021/110782, filed on Aug. 5, 2021.

(30) Foreign Application Priority Data

Aug. 5, 2020 (CN) .......................... 202010777613.1

(51) Int. Cl.
  *H04L 69/22* (2022.01)
  *H04L 9/40* (2022.01)
(52) U.S. Cl.
  CPC ...... *H04L 63/0485* (2013.01); *H04L 63/0414* (2013.01); *H04L 63/0428* (2013.01); *H04L 69/22* (2013.01); *H04L 2212/00* (2013.01)
(58) Field of Classification Search
  USPC ........................................................ 713/160
  See application file for complete search history.

(56) References Cited

U.S. PATENT DOCUMENTS

| 7,017,042 B1 * | 3/2006 | Ziai ........................... H04L 9/00 713/161 |
| 2014/0192808 A1 | 7/2014 | Thubert et al. |

(Continued)

FOREIGN PATENT DOCUMENTS

| CN | 100370694 C | * | 2/2008 | ............. H03G 3/345 |
| CN | 101742045 A | * | 6/2010 | ............. H04L 69/16 |

(Continued)

OTHER PUBLICATIONS

CN202010777613.1—First Office Action mailed on Dec. 23, 2021, 15 pages.

(Continued)

*Primary Examiner* — Sakinah White Taylor
(74) *Attorney, Agent, or Firm* — Getech Law LLC; Jun Ye

(57) ABSTRACT

A data sending method and apparatus and a data receiving method and apparatus for resisting network communication monitoring, wherein the data sending method including: acquiring a target packet; adding an encapsulation header into the target packet and encrypting application data in the target packet to obtain a to-be-sent packet; constructing a confusing packet, the header of the confusing packet being different from the header of the to-be-sent packet at a preset position; and sending a mixed packet of the to-be-sent packet and the confusing packet. In the present disclosure, a communication source hides a data packet to confuses probes, adds an encapsulation header on the basis of the data packet, hides the data packet in a large number of similar packets in a network, and makes an encryption in combination with a mature encryption technology, thereby effectively resisting malicious network communication monitoring and preventing eavesdropping of network communications.

8 Claims, 4 Drawing Sheets

| Ethernet Header | IP Header | TCP Header | Application Data | Ethernet Tail |

(56) References Cited

U.S. PATENT DOCUMENTS

| | | | | |
|---|---|---|---|---|
| 2014/0369365 A1* | 12/2014 | Denio | ............... | H04L 69/16 |
| | | | | 370/474 |
| 2015/0117460 A1* | 4/2015 | Persson | ............... | H04L 69/22 |
| | | | | 370/392 |
| 2018/0167365 A1 | 6/2018 | Zarcone | | |

FOREIGN PATENT DOCUMENTS

| | | | | | |
|---|---|---|---|---|---|
| CN | 103812926 | A | | 5/2014 | |
| CN | 104702505 | A | | 6/2015 | |
| CN | 105471827 | A | | 4/2016 | |
| CN | 105979508 | A | | 9/2016 | |
| CN | 106789388 | A | | 5/2017 | |
| CN | 107113239 | A | * | 8/2017 | ............ H04L 45/566 |
| CN | 110505161 | A | | 11/2019 | |
| CN | 110651447 | A | * | 1/2020 | ......... H04L 63/0414 |
| CN | 110868375 | A | | 3/2020 | |
| CN | 111787032 | A | | 10/2020 | |
| JP | 6068657 | B2 | * | 1/2017 | ......... H04L 61/6022 |
| WO | WO-2010012996 | A2 | * | 2/2010 | ........... H04L 65/605 |
| WO | 2020023593 | A1 | | 1/2020 | |
| WO | 2022028513 | A1 | | 2/2022 | |

OTHER PUBLICATIONS

CN202010777613.1—Supplementary Search Report mailed on Dec. 16, 2021, 5 pages.

PCT/CN2021/110782—International Search Report and Written Opinion mailed on Nov. 3, 2021, 14 pages.

CN 202010777613.1, Search Report, mailed Dec. 16, 2021, 6 pages. (with English translation).

CN 202010777613.1, Notice of Allowance, mailed Aug. 8, 2022, 2 pages. (with English translation).

\* cited by examiner

| Ethernet Header | IP Header | TCP Header | Application Data | Ethernet Tail |

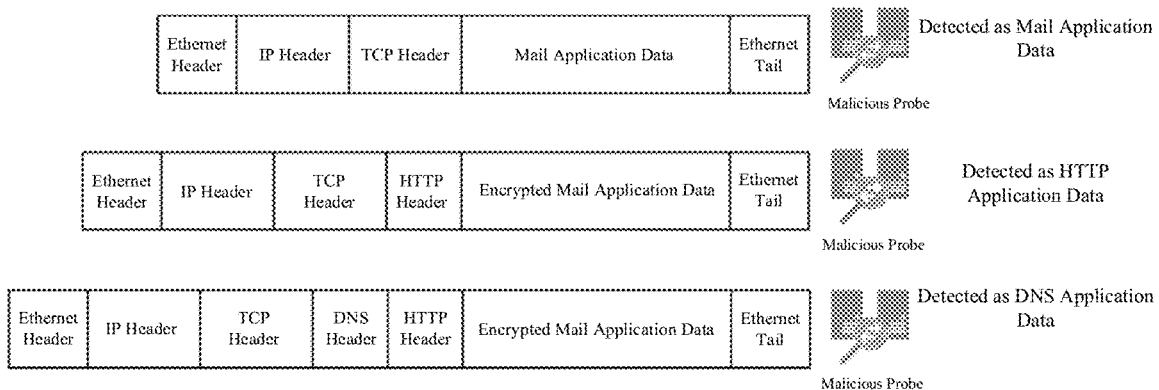

Fig. 5

```
Receiving a mixed packet and acquiring a real
packet containing a target packet from the mixed
packet based on a difference between a header of a
confusing packet and a header of the real packet at
a preset position
```

↓

```
Removing an encapsulation header of the real
packet and decrypting encrypted application data
of the real packet to obtain the target packet
```

Fig. 6

DATA SENDING METHOD AND APPARATUS AND DATA RECEIVING METHOD AND APPARATUS FOR RESISTING NETWORK COMMUNICATION MONITORING

CROSS-REFERENCE TO RELATED APPLICATIONS

This application is a continuation of International Application No. PCT/CN2021/110782, filed on Aug. 5, 2021, which claims priority to Chinese Patent Application No. CN202010777613.1 filed on Aug. 5, 2020, which are hereby incorporated by reference in their entireties.

TECHNICAL FIELD

The present disclosure relates to a field of communications, and particularly to a data sending method and apparatus and a data receiving method and apparatus for resisting network communication monitoring.

BACKGROUND ART

With the reveal of the Snowden incident, we have clearly realized the ubiquitous monitoring. Usually, there are a large number of illegal probes in the network to monitor the network communication, and they are used by domestic and foreign vicious power to steal and analyze the intelligence information. There is no national security without the network security. In the information- and network-based society nowadays, there is an urgent need for technical means to prevent malicious eavesdropping.

SUMMARY OF THE DISCLOSURE

An objective of the present disclosure is to provide a data sending method and apparatus and a data receiving method and apparatus for resisting network communication monitoring, so as to increase the privacy and the security of a network communication and prevent eavesdropping of network communications.

In order to solve the above problem, a first aspect of the present disclosure provides a data sending method for resisting network communication monitoring, comprising: acquiring a target packet; adding an encapsulation header into the target packet and encrypting application data in the target packet to obtain a to-be-sent packet; constructing a confusing packet, the header of the confusing packet being different from the header of the to-be-sent packet at a preset position; and sending a mixed packet of the to-be-sent packet and the confusing packet.

In an embodiment of the present disclosure, the sending address of the confusing packet is a target address and/or a randomly constructed virtual address.

In an embodiment of the present disclosure, the data sending method for resisting network communication monitoring further comprises supervising a header of packets with a largest traffic in a network; the adding an encapsulation header into the target packet comprises: adding the header of packets with the largest traffic into the encapsulation header; and adding the encapsulation header into the target packet.

In an embodiment of the present disclosure, the encapsulation header is a hierarchically encapsulated multi-layer header.

In an embodiment of the present disclosure, the target packet comprises an Ethernet header, an IP header, a TCP header, the application data and an Ethernet tail; the adding an encapsulation header into the target packet comprises: inserting the encapsulation header between the TCP header and the application data.

A second aspect of the present disclosure provides a data receiving method for resisting network communication monitoring, comprising: receiving a mixed packet and acquiring a real packet containing a target packet from the mixed packet based on a difference between a header of a confusing packet and a header of the real packet at a preset position; and removing the encapsulation header of the real packet and decrypting encrypted application data of the real packet to obtain the target packet.

In an embodiment of the present disclosure, the acquiring a real from a mixed packet based on a difference between a header of a confusing packet and a header of the real packet at a preset position comprises: inquiring codes at the preset position of a packet in the mixed packet, and determining that the inquired packet in the mixed packet is the real packet if the codes are the same as the preset codes.

In an embodiment of the present disclosure, the removing the encapsulation header of the real packet comprises hierarchically removing a plurality of layers of the encapsulation header in the case the encapsulation header is a hierarchically encapsulated multi-layer header.

A third aspect of the present disclosure provides a data sending apparatus for resisting network communication monitoring, comprising: a data acquiring module configured to acquire a target packet; an encapsulation encryption module configured to add an encapsulation header into the target packet and encrypt application data in the target packet to obtain a to-be-sent packet; a confusion constructing module configured to construct a confusion packet, the header of the confusing packet being different from the header of the to-be-sent packet at a preset position; and a data sending module configured to send a mixed packet of the to-be-sent packet and the confusing packet.

In an embodiment of the present disclosure, the data sending apparatus for resisting network communication monitoring further comprises: a supervision module configured to supervise the header of packets with a largest traffic in a network and send the header to the encapsulation encryption module.

A fourth aspect of the present disclosure provides a data receiving apparatus for resisting network communication monitoring, comprising: a comparison acquiring module configured to receive a mixed packet and acquire a real packet containing a target packet from the mixed packet based on a difference between a header of a confusing packet and a header of the real packet at a preset position; and a removal and decryption module configured to remove the encapsulation header of the real packet and decrypt encrypted application data of the real packet to obtain the target packet.

In an embodiment of the present disclosure, the removal and decryption module comprises at least one transfer unit, and each of the transfer unit removes at least one layer of the encapsulation header.

The above technical solutions of the present disclosure have the following advantageous technical effects:

In the present disclosure, a communication source hides a data packet to confuse probes, adds an encapsulation header on the basis of the data packet to be sent, hides the data packet in a large number of similar packets in a network, and makes an encryption in combination with a mature encryption technology, thereby effectively resisting malicious network communication monitoring and achieving an effect of preventing eavesdropping of network communications.

BRIEF DESCRIPTION OF THE DRAWINGS

FIG. 5 is a schematic diagram of detecting various packets provided in Embodiment 1 of the present disclosure;

FIG. 6 is a flowchart of a data receiving method for resisting network communication monitoring provided in Embodiment 2 of the present disclosure;

DETAILED DESCRIPTION OF THE PREFERRED EMBODIMENTS

In order that the objectives, technical solutions and advantages of the present disclosure are clearer, the present disclosure will be further described in detail as follows in conjunction with the specific embodiments and with reference to the drawings. It should be noted that those descriptions are only exemplary and not intended to limit the scope of the present disclosure. In addition, descriptions of the well-known structures and technologies are omitted hereinafter to avoid unnecessarily obscuring the concepts of the present disclosure.

Obviously, the described embodiments are only parts of the embodiments of the present disclosure, not all of them. Based on the described embodiments of the present disclosure, all other embodiments which can be obtained by the ordinarily-skilled in the art without creative work should fall within the protection scope of the present disclosure. In addition, the technical features involved in different embodiments of the present disclosure described below can be combined with each other as long as there are no confliction therebetween.

Figures 1, 2:
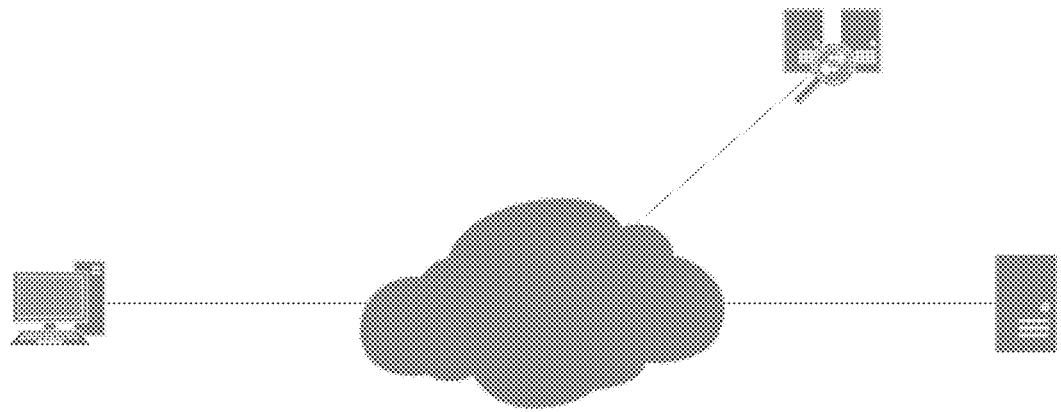
FIG. 1 is a schematic diagram of a packet.
FIG. 2 is a schematic diagram of a normal communication process.

FIG. 1 is a schematic diagram of a packet. FIG. 2 is a schematic diagram of a normal communication process.

As illustrated in FIGS. 1 and 2, a general packet is composed of an Ethernet header, an IP header, a TCP header, application data and an Ethernet tail. When such a packet is sent, the application data therein is easy to be detected by malicious probes, resulting in a leakage of the application data.

Embodiment 1

Figure 3:
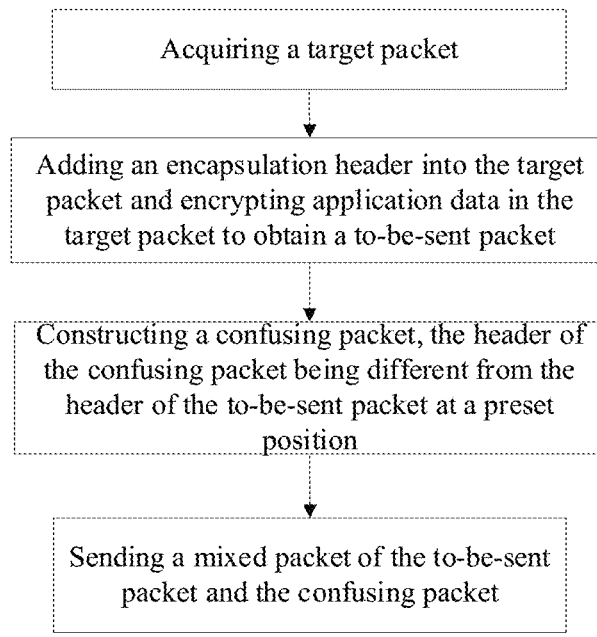
FIG. 3 is a flowchart of a data sending method for resisting network communication monitoring provided in Embodiment 1 of the present disclosure.

FIG. 3 is a flowchart of a data sending method for resisting network communication monitoring provided in Embodiment 1 of the present disclosure.

As illustrated in FIG. 3, this embodiment provides the data sending method for resisting network communication monitoring, comprising: acquiring a target packet; adding an encapsulation header into the target packet and encrypting application data in the target packet to obtain a to-be-sent packet (i.e., a real packet containing the target packet); constructing a confusing packet; the header of the confusing packet being different from the header of the to-be-sent packet at a preset position; and sending a mixed packet of the to-be-sent packet and the confusing packet.

In this embodiment, a communication source hides a data packet to confuse probes, adds an encapsulation header on the basis of the data packet to be sent, hides the data packet in a large number of similar packets in a network, and makes an encryption in combination with a mature encryption technology, thereby effectively resisting the malicious network communication monitoring and achieving the effect of preventing eavesdropping of network communications.

Optionally, the confusing packet comprises multiple types of packets, including but not limited to HTTP, DNS, FTP, DHCP, SNMP, SSH and SMTP, and the present disclosure is not limited thereto. Further, the encapsulation header is the header of a packet type having the largest number of packets among the confusing packets, such as the HTTP header.

Optionally, the encapsulation header of the confusing packet comprises a header of multiple types of packets, including but not limited to an HTTP header, a DNS header, an FTP header, a DHCP header, an SNMP header, an SSH header and/or an SMTP header.

Optionally, the header of the confusing packet and the header of the to-be-sent packet are different at a preset position, and specifically, it may be agreed in advance that the m-th bit to the n-th bit of the TCP header of the packet to be sent constitute predetermined codes.

Optionally, the sending address of the confusing packet is a target address and/or a randomly constructed virtual address, which can be realized by modifying the IP header.

Optionally, the encrypting application data in the target packet comprises: symmetrically encrypting application data in the target packet with a private algorithm.

Preferably, the data sending method for resisting network communication monitoring further comprises: supervising the header of packets with a largest traffic in a network; the adding an encapsulation header into the target packet comprises: adding the header of packets with the largest traffic into the encapsulation header; and adding the encapsulation header into the target packet, which may further hide the target packet into more packets of the same type, so as to further reduce the probability of information eavesdropping.

Figure 4:
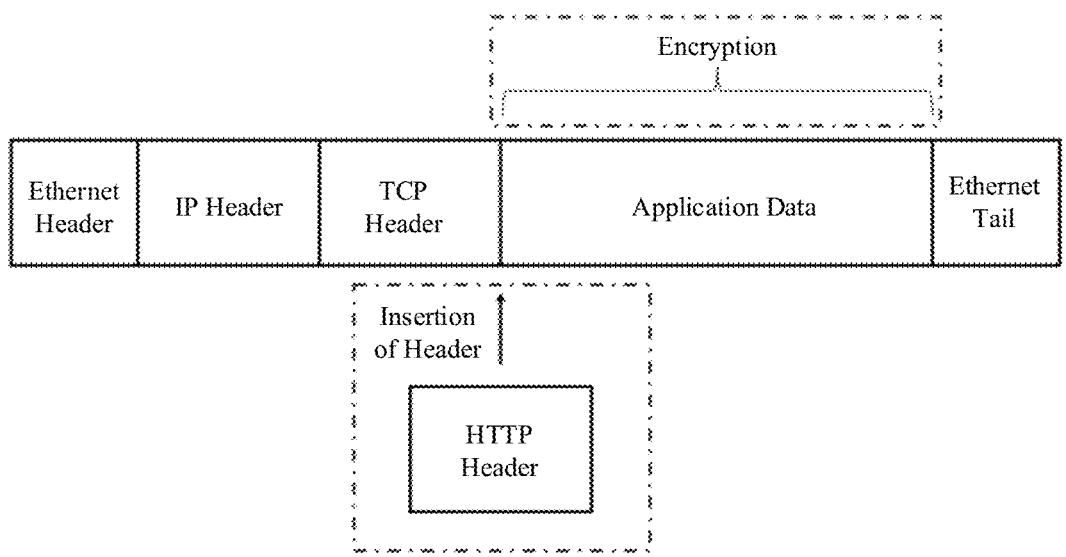
FIG. 4 is a schematic diagram of a to-be-sent packet provided in Embodiment 1 of the present disclosure.

FIG. 4 is a schematic diagram of a to-be-sent packet provided in Embodiment 1 of the present disclosure.

As illustrated in FIG. 4, optionally, the target packet comprises an Ethernet header, an IP header, a TCP header, the application data and an Ethernet tail; the adding an encapsulation header into the target packet comprises: inserting the encapsulation header between the TCP header and the application data. The encapsulation header in FIG. 4 is illustrated as the HTTP header as an example.

Preferably, the encapsulation header is a hierarchically encapsulated multi-layer header.

FIG. 5 is a schematic diagram of detecting various packets provided in Embodiment 1 of the present disclosure.

As illustrated in FIG. 5, the upper part of the drawing shows one type of target packet, wherein the application data, such as mail application data, will be detected by the malicious probes; the middle part of the drawing shows a to-be-sent packet in which application data is encrypted and an encapsulation header is added and the encapsulation header is one layer of encapsulation header, wherein application data of HTTP type will be detected by the malicious probes so as to ensure the security of application data therein; and the lower part of the drawing shows a to-be-sent packet in which application data is encrypted and an encapsulation header is added, the encapsulation header is two layers of encapsulation headers, wherein application data of DNS type will be detected by the malicious probes to further ensure the security of application data therein.

Embodiment 2

FIG. 6 is a flowchart of a data receiving method for resisting network communication monitoring provided in Embodiment 2 of the present disclosure.

As illustrated in FIG. 6, the data receiving method for resisting network communication monitoring provided in this embodiment receives data sent by the data sending method for resisting network communication monitoring provided in Embodiment 1, the data receiving method comprising: receiving a mixed packet and acquiring a real packet containing a target packet from the mixed packet based on a difference between the header of the confusing packet and the header of the real packet at a preset position; and removing the encapsulation header of the real packet and decrypting encrypted application data of the real packet to obtain the target packet.

Optionally, the header of the confusing packet is different from the header of the real packet at the preset position, and specifically, it may be agreed in advance that the m-th bit to the n-th bit of the TCP header of the real packet constitute predetermined codes.

Further optionally, the acquiring a real packet containing a target packet from the mixed packet based on a difference between the header of a confusing packet and the header of the real packet at a preset position comprises: inquiring codes at the preset position of a packet in the mixed packet; determining that the inquired packet in the mixed packet is the real packet if the codes are the same as the preset codes; and determining that the inquired packet in the mixed packet is the confusing packet and discarding the mixed packet if the codes are different from the preset codes.

Preferably, the removing the encapsulation header of the to-be-sent packet comprises hierarchically removing a plurality of layers of the encapsulation header in the case that the encapsulation header is a hierarchically encapsulated multi-layer header.

Embodiment 3

Figure 7:
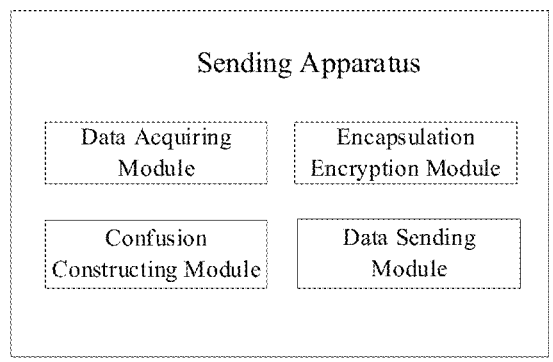
FIG. 7 is a schematic diagram of a structure of a data sending apparatus for resisting network communication monitoring provided in Embodiment 3 of the present disclosure.

FIG. 7 is a schematic diagram of a structure of a data sending apparatus for resisting network communication monitoring provided in Embodiment 3 of the present disclosure.

As illustrated in FIG. 7, the data sending apparatus for resisting network communication monitoring provided in this embodiment is configured to perform the data sending method for resisting network communication monitoring provided in Embodiment 1, the data sending apparatus comprising: a data acquiring module configured to acquire a target packet; an encapsulation encryption module configured to add an encapsulation header into the target packet and encrypt application data in the target packet to obtain a to-be-sent packet; a confusion constructing module configured to construct a confusion packet, the header of the confusing packet being different from the header of the to-be-sent packet at a preset position; and a data sending module configured to send a mixed packet of the to-be-sent packet and the confusing packet.

Optionally, the data sending apparatus for resisting network communication monitoring further comprises a supervision module configured to supervise the header of packets with a largest traffic in a network and send the header to the encapsulation encryption module.

Other portions which are the same as those in Embodiment 1 will not be described in detail in this embodiment.

Embodiment 4

Figure 8:
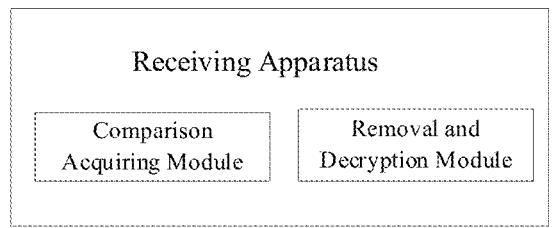
FIG. 8 is a schematic diagram of a structure of a data receiving apparatus for resisting network communication monitoring provided in Embodiment 4 of the present disclosure.

FIG. 8 is a schematic diagram of a structure of a data receiving apparatus for resisting network communication monitoring provided in Embodiment 4 of the present disclosure.

As illustrated in FIG. 8, the data receiving apparatus for resisting network communication monitoring provided in this embodiment is configured to perform the data receiving method for resisting network communication monitoring provided in Embodiment 2, the data receiving apparatus comprising: a comparison acquiring module configured to receive a mixed packet and acquire a real packet containing a target packet from the mixed packet based on a difference between a header of a confusing packet and a header of the real packet at a preset position; and a removal and decryption module configured to remove an encapsulation header of the real packet and decrypt encrypted application data of the real packet to obtain the target packet.

The removal and decryption module comprises: at least one transfer unit, and each of the transfer unit removes at least one layer of the encapsulation header.

Other portions which are the same as those in Embodiment 2 will not be described in detail in this embodiment.

Embodiment 5

This embodiment provides a client, comprising the data sending apparatus for resisting network communication monitoring provided in Embodiment 3 and the data receiving apparatus for resisting network communication monitoring provided in Embodiment 4.

Embodiment 6

This embodiment provides a server, comprising the data sending apparatus for resisting network communication monitoring provided in Embodiment 3 and the data receiving apparatus for resisting network communication monitoring provided in Embodiment 4.

The present disclosure can effectively resist malicious network communication monitoring and achieve an effect of preventing eavesdropping of network communications, since the communication source hides a data packet to confuse probes, adds an encapsulation header on the basis of the data packet to be sent, hides the data packet in a large number of similar packets in a network, and makes an encryption in combination with a mature encryption technology.

It should be understood that the above specific embodiments of the present disclosure are only used to exemplarily illustrate or explain the principles of the present disclosure, rather than limiting the present disclosure. Thus, any modification, equivalent substitution, improvement, etc. made without departing from the spirit and scope of the present disclosure should fall within the protection scope of the present disclosure. In addition, the appended claims of the present disclosure are intended to cover all changes and modifications that fall within the scope and boundary of the appended claims, or equivalents of such scope and boundary.

What is claimed:

1. A data sending method for resisting network communication monitoring, comprising:
   acquiring a target packet;
   adding an encapsulation header for hiding the type of the target packet into the target packet and encrypting application data in the target packet to obtain a to-be-sent packet; the target packet comprising an Ethernet header, an IP header, a TCP header, an application data and an Ethernet tail; and adding an encapsulation header into the target packet comprising: inserting the encapsulation header between the TCP header and the application data;
   constructing a confusing packet, the header of the confusing packet different from the header of the to-be-sent packet at a preset position; and
   sending a mixed packet of the to-be-sent packet and the confusing packet, so that the destination receiver of the mixed packet recognizes the to-be-sent packet in the mixed packet based on the difference in the preset position between the header of the confusing packet and the header of the to-be-sent packet.

2. The data sending method for resisting network communication monitoring according to claim 1, wherein the sending address of the confusing packet is a target address and/or a randomly constructed virtual address.

3. The data sending method for resisting network communication monitoring according to claim 1, further comprising supervising a header of packets with a largest traffic in a network;
   adding an encapsulation header into the target packet comprises:
   adding the header of packets with the largest traffic into the encapsulation header; and
   adding the encapsulation header into the target packet.

4. The data sending method for resisting network communication monitoring according to claim 1, wherein the encapsulation header is a hierarchically encapsulated multi-layer header.

5. A data receiving method for resisting network communication monitoring, comprising:
   acquiring a to-be-sent target packet from the received mixed packet based on a difference between a header of a confusing packet and a header of the to-be-sent packet at a preset position;
   removing an encapsulation header of the to-be-sent packet for hiding the type of the target packet and decrypting encrypted application data of the to-be-sent packet to obtain the target packet; the target packet comprising an Ethernet header, an IP header, a TCP header, the application data and an Ethernet tail; and adding an encapsulation header into the target packet comprising: inserting the encapsulation header between the TCP header and the application data; and
   wherein the removing an encapsulation header of the to-be-sent packet comprises hierarchically removing a plurality of layers of the encapsulation header in the case that the encapsulation header is a hierarchically encapsulated multi-layer header.

6. The data receiving method for resisting network communication monitoring according to claim 5, wherein,
   the acquiring a to-be-sent packet containing a target packet from the mixed packet based on a difference between a header of a confusing packet and a header of the to-be-sent packet at the preset position comprises:
   inquiring codes at the preset position of a packet in the mixed packet, and determining that the inquired packet in the mixed packet is the to-be-sent packet when the codes are the same as preset codes.

7. A data sending apparatus for resisting network communication monitoring, comprising circuitry of the data sending apparatus:
   to acquire a target packet;
   to add an encapsulation header for hiding the type of the target packet into the target packet and encrypt application data in the target packet to obtain a to-be-sent packet; the target packet comprising an Ethernet header, an IP header, a TCP header, the application data and an Ethernet tail; and adding an encapsulation header into the target packet comprising: inserting the encapsulation header between the TCP header and the application data;
   to construct a confusion packet, the header of the confusing packet different from the header of the to-be-sent packet at a preset position; and
   to send a mixed packet of the to-be-sent packet and the confusing packet, so that the destination receiver of the mixed packet recognizes the to-be-sent packet in the mixed packet based on the difference in the preset position between the header of the confusing packet and the header of the to-be-sent packet.

8. The data sending apparatus for resisting network communication monitoring according to claim 7, further comprising circuitry of the data sending apparatus:
   to supervise the header of packets with a largest traffic in a network and send the header to the circuitry.

* * * * *